United States Patent [19]
Smith et al.

[11] Patent Number: 6,028,667
[45] Date of Patent: Feb. 22, 2000

[54] COMPACT AND ROBUST SPECTROGRAPH

[75] Inventors: Lee M. Smith, Salt Lake City; Robert E. Benner, Holladay, both of Utah

[73] Assignee: Process Instruments, Inc., Utah

[21] Appl. No.: 09/231,606

[22] Filed: Jan. 14, 1999

Related U.S. Application Data

[63] Continuation-in-part of application No. 09/054,588, Apr. 3, 1998, which is a continuation-in-part of application No. 08/647,586, May 13, 1996, Pat. No. 5,751,415.

[51] Int. Cl.$^7$ .................................................. G01J 3/44
[52] U.S. Cl. .................................... 356/301; 356/328
[58] Field of Search ..................... 356/70, 301, 317–318, 356/300, 334, 328, 326, 440, 417, 436, 73, 39; 250/227.23, 573, 574; 385/12, 13

[56] References Cited

U.S. PATENT DOCUMENTS

| | | |
|---|---|---|
| 3,906,241 | 9/1975 | Thompson . |
| 4,416,505 | 11/1983 | Dickson . |
| 4,530,564 | 7/1985 | Close . |
| 4,540,280 | 9/1985 | Anderson et al. . |
| 4,573,761 | 3/1986 | McLachlan et al. . |
| 4,579,457 | 4/1986 | Guigues . |
| 4,630,923 | 12/1986 | Tans et al. . |
| 4,688,879 | 8/1987 | Fairchild . |
| 4,783,168 | 11/1988 | Florisson et al. . |
| 4,786,171 | 11/1988 | LeFebre et al. . |
| 4,818,045 | 4/1989 | Chang . |
| 4,830,441 | 5/1989 | Chang . |
| 4,867,559 | 9/1989 | Bach . |
| 4,879,167 | 11/1989 | Chang . |
| 4,884,276 | 11/1989 | Dixon et al. . |
| 4,895,445 | 1/1990 | Granger . |
| 4,896,325 | 1/1990 | Coldren . |
| 4,917,491 | 4/1990 | Ring et al. . |
| 4,937,448 | 6/1990 | Mantz et al. . |
| 4,943,971 | 7/1990 | Fiet et al. . |
| 4,963,745 | 10/1990 | Maggard . |

(List continued on next page.)

FOREIGN PATENT DOCUMENTS

| | | |
|---|---|---|
| 228 990 | 10/1985 | Germany . |
| 56-55842 | 5/1981 | Japan . |
| 1-287448 | 11/1989 | Japan . |

OTHER PUBLICATIONS

Schwab et al "Renate . . . Spectroscopy" Applied Spectroscopy, vol. 41, No. 1 1987 pp 126–130.

Gilmore et al; "Quantitative . . . Spectroscopy" Applied Spectroscopy, vol. 49, No. 4 1995 pp 508–512.

"SDL–8530—785 nm, 300 mW cw Wavelength–Stabilized High Power Laser Diode System," *SDL Product Catalog*, pp. C5–C7 (1996/1997).

Mark D. Weiss, "NMR and Raman Spectroscopies Move from Lab to Plant," *Today's Chemist at Work*, pp. 25–28, (Jan. 1995).

W. R. Kalsi, A. S. Sarpal, S. K. Jain, S. P. Srivastava, and A. K. Bhatnagar, "Determination of Oxygenates in Gasoline by 1H Nuclear Magnetic Resonance Spectroscopy," *Energy & Fuels*, pp. 574–579 (May 4, 1995).

Andrew J. Vreugdenhil and Ian S. Butler, "Detection of the Engine Anti–knock Additive Methylcyclopentadienyl Manganese Tricarbonyl (MMT) from Unleaded Gasoline in Soil by Diffuse Reflectance Infrared Fourier Transfer Spectroscopy and Mass Spectroscopy," *Applied Spectroscopy*, vol. 49 No. 4, pp. 482–485 (1995).

(List continued on next page.)

*Primary Examiner*—K. P. Hantis
*Attorney, Agent, or Firm*—Madson & Metcalf

[57] ABSTRACT

A spectrograph for analyzing the chemical composition of a sample is disclosed. Scattered light from a sample cell is collected by one or more optical fibers and is introduced into a collimating lens as a linear optical signal. The collimating lens directs the optical signal to a reflective diffraction grating which reflects the signal into a focusing lens. The focusing lens focuses the optical signal onto a charge coupled device array which converts the optical signal into a electronic signal. Aberration correction is provided by the collimating and focussing lenses. The electronic signal is analyzed and converted by computer into a representation of the chemical analysis of the sample stream.

24 Claims, 4 Drawing Sheets

U.S. PATENT DOCUMENTS

| | | |
|---|---|---|
| 4,973,561 | 11/1990 | Hansen et al. . |
| 4,978,182 | 12/1990 | Tedesco . |
| 4,990,780 | 2/1991 | Lee et al. . |
| 4,995,050 | 2/1991 | Waarts et al. . |
| 5,011,284 | 4/1991 | Tedesco et al. . |
| 5,015,049 | 5/1991 | Chang . |
| 5,022,038 | 6/1991 | Bradley . |
| 5,028,563 | 7/1991 | Feit et al. . |
| 5,058,124 | 10/1991 | Cameron et al. . |
| 5,071,208 | 12/1991 | Chang . |
| 5,077,481 | 12/1991 | Hoult . |
| 5,103,453 | 4/1992 | Kebabian et al. . |
| 5,112,127 | 5/1992 | Carrabba et al. . |
| 5,119,338 | 6/1992 | Saito . |
| 5,124,815 | 6/1992 | Chang . |
| 5,139,334 | 8/1992 | Clarke . |
| 5,166,747 | 11/1992 | Schroeder et al. . |
| 5,170,056 | 12/1992 | Berard et al. . |
| 5,179,630 | 1/1993 | Chang et al. . |
| 5,194,910 | 3/1993 | Kirkpatrick, Jr. et al. . |
| 5,220,401 | 6/1993 | Milsevic et al. . |
| 5,225,679 | 7/1993 | Clark et al. . |
| 5,319,668 | 6/1994 | Luecke . |
| 5,348,645 | 9/1994 | Maggard et al. . |
| 5,349,188 | 9/1994 | Maggard . |
| 5,349,189 | 9/1994 | Maggard . |
| 5,360,972 | 11/1994 | DiFoggio et al. . |
| 5,362,965 | 11/1994 | Maggard . |
| 5,377,004 | 12/1994 | Owen et al. . |
| 5,381,237 | 1/1995 | Sela . |
| 5,386,426 | 1/1995 | Stephens . |
| 5,402,241 | 3/1995 | Jeannotte et al. . |
| 5,404,218 | 4/1995 | Nave et al. . |
| 5,418,631 | 5/1995 | Tedesco . |
| 5,424,825 | 6/1995 | Delhaye et al. . |
| 5,442,439 | 8/1995 | Battey et al. . |
| 5,455,673 | 10/1995 | Alsmeyer et al. . |
| 5,471,327 | 11/1995 | Tedesco et al. . |
| 5,524,012 | 6/1996 | Wang et al. . |
| 5,530,565 | 6/1996 | Owen . |
| 5,559,597 | 9/1996 | Battey et al. . |
| 5,587,847 | 12/1996 | Chang et al. . |
| 5,596,196 | 1/1997 | Cooper et al. . |
| 5,610,836 | 3/1997 | Alsmeyer et al. . |
| 5,615,673 | 4/1997 | Berger . |
| 5,638,172 | 6/1997 | Alsmeyer et al. . |
| 5,644,396 | 7/1997 | Hopkins, II . |
| 5,652,653 | 7/1997 | Alsmeyer et al. . |
| 5,657,120 | 8/1997 | Smith . |
| 5,657,404 | 8/1997 | Buchanan et al. . |
| 5,751,415 | 5/1998 | Smith et al. . |
| 5,850,623 | 12/1998 | Carman, Jr. et al. . |

OTHER PUBLICATIONS

Christopher J. de Bakker and Peter M. Fredericks, "Determination of Petroleum Properties by Fiber–Optic Fourier Transform Raman Spectrometry and Partial Least–Squares Analysis," *Applied Spectroscopy*, vol. 49, No. 4, pp. 1766–1771 (1995).

John B. Cooper, Philip E. Flecher, Thomas M. Vess, and William T. Welch, "Remote Fiber–Optic Raman Analysis of Xylene Isomers in Mock Petroleum Fuels Using a Low––Cost Dispersive Instrument and Partial Least–Squares Regression Analysis." *Applied Spectroscopy*, vol. 49, No. 5 (1995).

John B. Cooper, Kent L. Wise, James Groves, and William T. Welch, "Determination of Octane Numbers and Reid Vapor Pressure of Commercial Petroleum Fuels Using FT–Raman Spectroscopy and Partial Least–Squares Regression Analysis," *Analytical Chemistry*, vol. 67, pp. 4095–4100 (1995).

Hillary L. MacDonald, Hao Liu, and Paul Yager, "Fiber Optic Sensor for General Anesthetics based on Raman Spectroscopy," *SPIE*, vol. 2131, pp. 514–524 (1994).

*Official Gazette* publication of Patent No. 5,363,463, p. 1302 (Nov. 8, 1994).

Francisco X. Garcia, Lola De Lima, and Julio C. Medina, "Determination of Methanol and Methyl tert–Butyl Ether in Gasoline by Infrared Spectroscopy Using the CIRCLE® Cell and Multivariate Calibration," *Applied Spectroscopy*, pp. 1036–1039 (1993).

Maximo Gallignani, Salvador Garrigues, and Miguel de la Guardia, "Direct Determinatin of Benzene in Gasoline by Flow–Injection Fourier Transform Infrared Spectrometry," pp. 267–274 (Amsterdam 1993).

*Official Gazette* publication of Patent No. 5,112,127, p. 912 (May 12, 1992).

Chen Zhaohui and Feng Xinlu, "Use NIR Spectroscopy for On–Line Gasoline Analysis," *Hydrocarbon Processing*, pp. 94–96 (Jan. 1992).

Cathy D. Newman, Georges G. Bret, and Richard L. McCreery, "Fiber–Optic Sampling Combined with an Imaging Spectrograph for Routine Raman Spectroscopy," *Applied Spectroscopy*, vol. 46, No. 2, pp. 262–265 (1992).

S. Michael Angel, Thomas M. Vess, and Michael L. Myrick, "Simultaneous Multi–point Fiber–optic Raman Sampling for Chemical Process Control Using Diode Lasers and A CCD Detector," *SPIE (Chemical, Biochemical, and Environmental Fiber Sensors III)*. vol. 1587, pp. 219–231 (1991).

Kenneth P. J. Williams, Rupert E. Aries, David J. Cutler, and David P. Lidiard, "Determination of Gas Oil Cetane Number and Cetane Index Using Near–Infrared Fourier Transform Raman Spectroscopy," *Analytical Chemistry*, vol. 62, No. 23, pp. 2553–2556 (Dec. 1, 1990).

Yan Wang and Richard L. McCreery, "Evaluation of a Diode Laser/Charge Coupled Device Spectrometer for Near–Infrared Raman Spectroscopy," *Analytical Chemistry*, vol. 61 No. 23, pp. 2647–2651 (Dec. 1, 1989).

M. B. Seasholtz, D. D. Archibald, A. Lorber, and B. R. Kowalski, "Quantitative Analysis of Liquid Fuel Mixtures with the Use of Fourier Transform Near–IR Raman Spectroscopy," *Applied Spectroscopy*, vol. 43, No. 6, pp. 1067–1072 (1989).

*Official Gazette* publication of Patent No. 4,858,238, p. 2092 (Aug. 15, 1989).

*Official Gazette* publication of Patent No. 4,645,340 (Feb. 24, 1987).

*Official Gazette* publication of Patent No. 4,630,923, p. 2022 (Dec. 23, 1986).

COMPACT AND ROBUST SPECTROGRAPH

RELATED APPLICATION

This invention is a continuation-in-part of U.S. patent application Ser. No. 09/054,588, filed Apr. 3, 1998, titled "Raman Spectroscopy Apparatus and Method Using External Cavity Laser for Continuous Chemical Analysis of Fluid Streams" which application is a continuation-in-part of U.S. patent application Ser. No. 08/647,586, filed May 13, 1996, now U.S. Pat. No. 5,751,415, titled "Raman Spectroscopy Apparatus and Method for Continuous Chemical Analysis of Fluid Streams," which application and patent are incorporated herein by reference.

GOVERNMENT RIGHTS

This invention was made with Government support under SBIR contract No. F29601-97-C-0019 awarded by The Department of Defense.

FIELD OF THE INVENTION

The present invention includes a spectrograph which is robust and compact. The spectrograph apparatus can be used to analyze solid, liquid, or gas samples, including petroleum products, aqueous streams, biological samples, and solid slurries. The apparatus can be used either with flowing samples or samples contained in conventional cuvettes.

TECHNOLOGY BACKGROUND

Raman spectroscopy is an analytical technique which uses light scattering to identify and quantify molecules. When light of a single wavelength (monochromatic) interacts with a molecule, the light scattered by the molecule contains small amounts of light with wavelengths different from the incident light. The wavelengths present in the scattered light are characteristic of the structure of the molecule, and the intensity of this light is dependent on the concentration of these molecules. Thus, the identities and concentrations of various molecules in a substance can be determined by illuminating the substance with monochromatic light and then measuring the individual wavelengths and their intensities in the scattered light.

A continuing problem with Raman spectroscopy is the very low intensity of the scattered light compared to the incident light. Elaborate spectrographs, having high light gathering power and dispersion, high stray light rejection, and sensitive detectors, are required to isolate and measure the low intensity Raman scattered light. These instruments are costly and delicate, and are not well suited for use in industrial manufacturing or processing facilities. As a result, they have rarely been used outside of laboratory environments. Improvements in the fields of lasers, optical fibers, and filters enable one to remotely locate a fiberoptic probe from its laser light source and from its spectrograph.

It will be appreciated that there is a need in the art for a spectrograph apparatus which is compact and robust, suitable for use in industrial applications, which provides quick and accurate results.

SUMMARY OF THE INVENTION

The present invention is directed to a spectrograph, such as a Raman spectrograph, for analyzing the composition of a sample. The invention is particularly useful in analyzing fluid samples containing petroleum products, such as gasoline fuel or natural gas, biological liquids, solid slurries, and gaseous samples.

The spectrograph apparatus is adapted for use with a laser source and a sample cell. The laser source produces light having an excitation wavelength. Although conventional diode lasers can be used as the light source in the spectrograph, it is presently preferred to use an external cavity diode laser. The light output from the external cavity diode laser can be controlled to provide a powerful, yet stable light output compared to typical single mode diode lasers. Current Raman spectrographs use very narrow linewidth lasers, the broader linewidth obtained with the external cavity laser is adequate for the Raman uses contemplated herein. In one presently preferred embodiment, the excitation wavelength is in the range from 400 nm to 870 nm, having a bandwidth less than 30 GHz.

In a preferred embodiment, the light is introduced into an excitation optical fiber which is combined with one or more collection optical fibers to form a bundle of optical fibers. The fiber bundle is optically connected to the sample cell. In another preferred embodiment, light from the laser source is focussed directly into the sample cell. Depending upon the sample to be analyzed, the sample cell can be configured to allow continuous sample fluid flow therethrough or static analysis in a conventional cuvette.

Light from the laser source is coupled to the sample cell, and backscattered Raman signal (light) from the sample cell is preferably coupled to the one or more collection optical fibers. The optical fiber bundle is preferably separated from the sample within the sample cell by a transparent barrier such as an optical window and\or lens assembly.

Although the present invention is discussed in connection with Raman spectroscopy, it can be used in connection with fluorescence and other spectroscopy applications. In such applications, the optical signals are collected in essentially the same way.

In one presently preferred sample cell used for Raman analysis, the excitation light enters the cell through a transparent fluid barrier and interacts with the sample to be characterized. The light is absorbed by a color glass filter designed to absorb the excitation wavelength light. The filter is preferably oriented on a slight angle to minimize the amount of reflected laser light which enters the collection fibers. Raman scattered light emanating from the sample volume is preferably guided down the one or more collection fibers to the spectrograph.

The sample cell can be a flow-through sample cell comprising a sample stream inlet and a sample stream outlet for continuous sample flow analysis. Alternatively, the sample cell can be a conventional sample cell accommodating a cuvette or sample chamber. The flow-through sample cell is preferably not flow dependent, and it can be made with any practical internal volume, such as between 1 cc and 20 cc. For Raman analysis, the greater the distance between the input fiber and the absorbing filter, the more Raman interaction and consequently the greater the Raman signal is produced.

In one possible flow-through sample cell embodiment which can be used with the present invention, the Raman sample cell is lined with a material having an index of refraction less than the index of refraction of the sample stream so that light reflects internally at the interface between the sample and the sample cell liner. This eliminates light losses which would otherwise occur if the light passed through the liner and was reflected at the exterior (air interface) surface of the liner.

The one or more collection optical fibers are preferably configured to produce a linear optical signal of the scattered light from the sample cell. In a presently preferred embodiment, this is achieved by affixing a slit at the end of the collection optical fibers. In one presently preferred embodiment within the scope of the present invention, the slit has a width in the range from 20 µm to 150 µm. Current spectrographs usually require a pair of lenses to receive light from the optical fibers and direct it onto the slit and a collimating lens to receive the signal from the slit and direct it onto a grating. It has been found that directly affixing the slit at the end of the optical fibers can eliminate at least one lens, and often two lenses, from the spectrograph system.

Because there are signal losses associated with each lens and optical interface in a spectrograph, the ability to eliminate lenses and optical interfaces can improve the overall performance of the spectrograph. Furthermore, eliminating components, such as lenses, from the spectrograph renders the device more compact and robust because there are fewer components which can fall out of alignment.

Until now, persons having ordinary skill in the art have not placed a slit at the end of the collection fibers because it produces extra light scatter. However, it has been observed that the small light scatter produced is outweighed by the benefits obtained by eliminating two lenses.

Where a plurality of collection optical fibers are used, the fibers can be oriented parallel to the axis at which light passes through the spectrograph. The exit ends of the collection fibers can be aligned in a linear array so that a linear optical signal is generated. Orienting the exit ends of the optical fibers in a linear array can perform the same function as the optical slit by generating a linear optical signal. A slit can optionally be associated with the linear array of fibers. In such cases, the optical slit preferably has dimensions comparable to the linear array of collection optical fibers.

It is within the scope of the present invention to orient a plurality of collection optical fibers originating from different samples into a linear array. This arrangement enables multiplexing, or analysis of multiple samples simultaneously. Multiplexing procedures and techniques are known to persons having ordinary skill in the art.

In the spectrograph within the scope of the present invention, the linear optical signal from the collection optical fibers is transmitted to a collimating lens which is configured to receive the optical signal, collimate it, and direct it to a reflective diffraction grating. The collimating lens preferably has an f-number in the range from f/1 to f/2. This range of f-numbers provides a good balance between cost, size, and performance. The collimating lens has a focal length in the range from 25 mm to 75 mm. It will be appreciated that other f-numbers and focal lengths for the collimating lens can be used successfully in the present invention.

It is currently preferred to use a commercially available collimating lens utilizing multiple spherical lens elements. It has been found that commercially available multiple-element spherical lenses provide excellent performance in relation to their cost. In addition, the multi-element spherical lenses provide aberration correction.

The reflective diffraction grating is configured to receive the optical signal from the collimating lens and to disperse and reflect the signal to a focusing lens. The reflective diffraction grating preferably has between 600 and 1800 grooves/mm. More grooves/mm can be used to provide higher resolution, but at reduced spectral coverage. Similarly, fewer grooves/mm can be used, but at reduced resolution. The reflective diffraction grating preferably has a diffraction efficiency greater than 70%. Suitable diffraction gratings are commercially available from Spectronics Instrument, Inc., Rochester, N.Y.

The focusing lens is configured to receive the optical signal from the reflective diffraction grating and to focus it onto a charge coupled device ("CCD") array. Like the collimating lens, the focusing lens preferably has an f-number in the range from f/1 to f/2. This range of f-numbers provides a good balance between cost, size, and performance. The focusing lens has a focal length in the range from 25 mm to 75 mm. It will be appreciated that other f-numbers and focal lengths for the focusing lens can be used successfully in the present invention.

As with the collimating lens, the focusing lens can be a commercially available lens utilizing multiple spherical lens elements. Such commercially available spherical lenses provide excellent performance in relation to their cost. In addition, the multi-element spherical lenses provide aberration correction to the reflected signal from the diffraction grating.

The charge coupled device array converts the optical signal into a corresponding electronic signal. A computer or similar device can be used to convert the electronic signal into a representation of the analysis of the sample.

When used for Raman spectroscopy, the apparatus further comprises a notch or high pass filter which does not transmit light having the excitation wavelength. In this way, scattered portions of the optical signal having the excitation wavelength are eliminated so that just the Raman signal is measured. In one preferred embodiment described above, an absorption filter is affixed to or disposed in the sample cell. When disposed in the sample cell, the absorption filter is preferably oriented at an angle to minimize reflection of the light directed into the Raman sample cell back to the one or more collection optical fibers.

Through use of an optical fiber bundle, it is possible to locate the sample cell in a remote location near an industrial process stream. The spectrograph, laser source, and computer can be located in a distant, protected environment. The spectrograph apparatus according to the present invention is stable, accurate, compact, and robust, rendering it suitable for use in industrial applications. The spectrograph within the scope of the present invention has been shown to provide excellent analysis of various samples, including fluid streams containing petroleum products. Of course, those skilled in the art will appreciate that the present invention can be readily adapted for use in analyzing other sample streams such as aqueous streams, biological samples, and solid slurries.

DETAILED DESCRIPTION OF THE PREFERRED EMBODIMENTS

Figure 1:
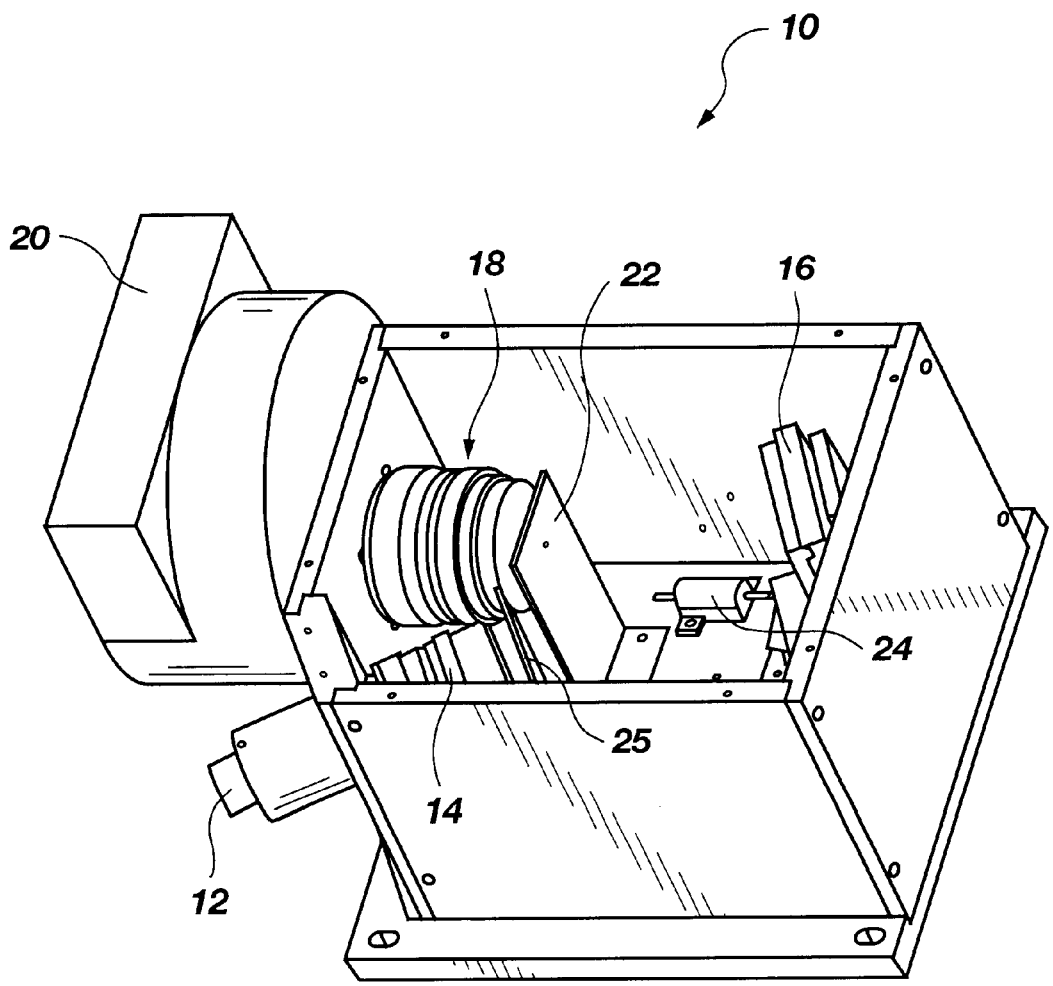
FIG. 1 is a schematic view of an apparatus for analyzing the composition of sample using Raman spectroscopy within the scope of the present invention.

Reference is now made to the figures wherein like parts are referred to by like numerals throughout. With particular reference to FIG. 1, a perspective view of a spectrograph apparatus 10 is illustrated. The spectrograph apparatus 10 is preferably used with a laser source and a sample cell which are not shown in FIG. 1.

The laser source produces light having an excitation wavelength. Although conventional diode lasers can be used as the light source, it is presently preferred to use an external cavity diode laser. External cavity diode lasers can provide a more stable and higher power output signal than typical index guided single mode diode lasers. Currently preferred output power of the laser source is about 1 watt. The excitation wavelength is preferably in the range from 200 nm to 870 nm. For Raman analysis of petroleum products, the wavelength is preferably in the range from 600 nm to 850 nm.

The output light from the external cavity diode laser system is preferably introduced into a sample cell via optical fiber coupling or direct sample cell illumination. Various possible sample cells are known to persons having ordinary skill in the art. In addition, suitable sample cells are disclosed in copending application Ser. No. 09/054,588, filed Apr. 3, 1998, titled "Raman Spectroscopy Apparatus and Method Using External Cavity Laser for Continuous Chemical Analysis of Fluid Streams" which has been incorporated by reference. Backscattered Raman signal (light) from the sample cell is preferably coupled to the one or more collection optical fibers.

A filter is preferably provided in the sample cell to absorb light having the excitation wavelength. A colored glass filter can be used. In addition, holographic or dielectric filter can be used in the spectrograph because of their good laser line rejection. Suitable dielectric filters are manufactured by optical filter companies such as Omega Optical. Holographic filters are made by companies such as Kaiser Optical, Ann Arbor, Mich. and Ralcon Development, Paradise, Utah.

The apparatus 10 includes an optical fiber input 12 configured to receive an optical signal from the sample cell via the one or more collection optical fibers. The one or more collection optical fibers are preferably configured to produce a linear optical signal of the scattered light from the sample cell.

Figure 2:
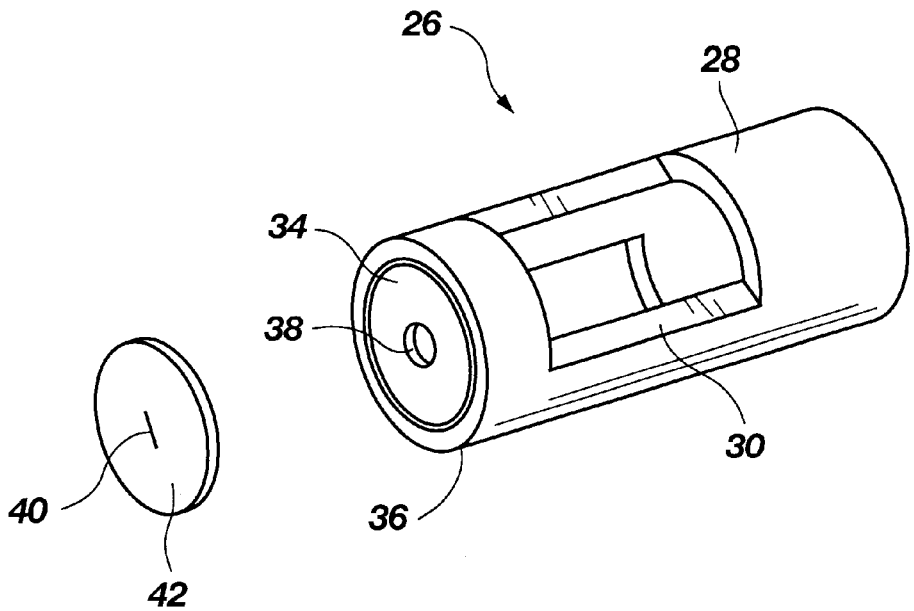
FIG. 2 is a perspective view of a slit and fiber mount assembly.
Figure 3:
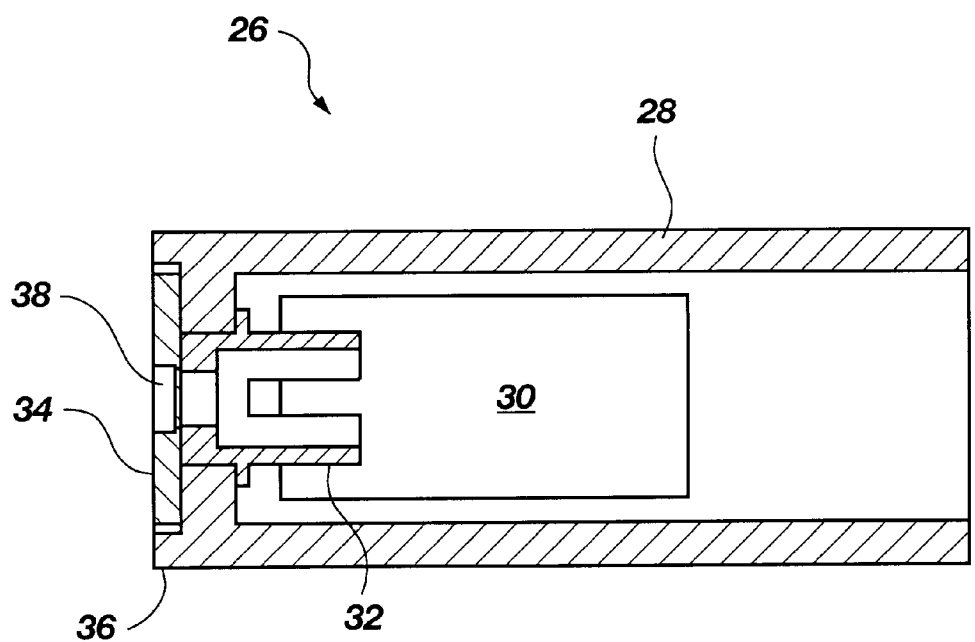
FIG. 3 is a sectional view of the slit and fiber mount assembly of FIG. 2.

In a presently preferred embodiment, a slit is affixed to the end of the collection optical fibers adjacent the fiber input 12. One possible slit and fiber mount assembly for use in the present invention is illustrated in FIGS. 2 and 3. The slit preferably has a width in the range from 20 to 150 $\mu$m. The narrower the slit the better the spectral resolution. However, this increased resolution also reduces the overall signal throughput. In a currently preferred embodiment, the slit ranges from 7 mm×25 $\mu$m to 7 mm×150 $\mu$m. The 7 mm height corresponds to the height of the CCD array, described below.

In another embodiment, the exit end of the collection fibers are aligned in a linear array to produce the linear optical signal. A linear array of optical fibers can perform the same function as the optical slit by generating a linear optical signal. In this manner, the slit and associated optics can be replaced by the linear array of optical fibers. By directly affixing the slit at the end of the optical fibers or aligning the exit end of the optical fibers as described, at least one lens, and often two lenses, can be eliminated from typical spectrographs.

A collimating lens 14 is provided to receive and convey the linear optical signal from the fiber input 12, to a reflective diffraction grating 16. The diffraction grating 16 reflects the signal to a focusing lens 18 which directs the signal to a charge coupled device 20.

The speed of the collimating and focusing lenses 14, 18 can vary, but faster speeds are generally preferred in order to capture more light. The improved performance obtained by faster lenses must be balanced by the increased cost of the lenses. The collimating and focusing lenses preferably have a speed in the range from f/1 to f/2, although lens speeds outside this range can be used. The collimating and focusing lenses 14, 18 preferably have a focal length in the range from 25 mm to 75 mm. It will be appreciated that other f-numbers and focal lengths for the collimating and focusing lenses can be used successfully in the present invention.

The collimating and focusing lenses 14, 18 are preferably commercially available lenses utilizing multiple spherical lens elements. It has been found that commercially available spherical lenses provide excellent performance in relation to their cost. In addition, it has been found that the spherical lenses provide aberration correction. The optical lenses and all optical interfaces are preferably coated with anti-reflection coatings to minimize light losses through the spectrograph.

A reflective diffraction grating 16 is used to disperse the signal. The diffraction grating 16 can be fabricated with various degrees of spectral resolution with equivalent grooves/mm from several hundred grooves/mm up to 2400 grooves/mm. The preferred resolution is on the order of 600 grooves/mm to 1800 grooves/mm. More grooves per mm increases the spectral resolution, but also decreases the optical signal throughput. Increased spectral resolution also increases the aberration that must be removed to obtain improved resolution. The choice of grating resolution depends upon the resolution required, the range covered by the CCD detector, and the degree of signal throughput desired.

The CCD 20 converts the optical signal into a corresponding electronic signal to be analyzed by a computer (not shown in FIG. 1) and converted into a representation of the chemical analysis of the fluid stream. The computer can also be used to control the laser source. The CCD 20 is preferably commercially available. As mentioned above, the CCD 20 preferably has a size corresponding to the optical signal from the focusing lens 18.

The configuration shown in FIG. 1 is currently preferred because it requires small space and allows the close coupling of the optical elements, i.e. the grating 16, lenses 14 and 18, and CCD array 20. It also allows for the use of a higher resolution diffraction grating. The closer coupling allows for greater light throughput for any given lens size.

An alignment target 22 is inserted into the spectrograph only when aligning the grating to ensure that the diffracted beam is in perfect alignment with the incoming and outgoing lenses. The alignment target 22 is not a critical part of the invention, rather it is a convenience for assembly of the spectrograph.

A resistive heater 24 is used to control the temperature of the spectrogrpah. A temperature controller is used to control the electrical current through the heaters and thus maintain a constant temperature. When the optical components are maintained at constant temperature, the whole optical system is much more stable, even when the spectrograph is used in environments where the ambient temperature changes by several degrees. The currently preferred embodiment is to control the spectrograph temperature a little above the ambient for optimum temperature control, using the heaters 24 as an energy source. Thermoelectric coolers can be used to control the temperature above or below ambient. However, the resistive heaters 24 are the simplest and most economical devices to maintain temperature.

An optional laser line rejection filter 25 can be associated with either the collimating or focusing lens to eliminate light having the excitation wavelength.

One currently preferred slit and fiber mount assembly 26 is shown in FIGS. 2 and 3. The assembly 26 is configured to fit on the end of the one or more collection optical fibers. The assembly includes a tubular housing 28. One or more housing windows 30 are located in the housing to facilitate attachment of the assembly 26 to the one or more collection optical fibers. A fiber mount 32 is provided to receive and position the optical fibers within the assembly 26. A slit mount 34 is located at the distal end 36 of the assembly 26 for retaining a suitable optical slit. A small opening 38 is provided in the slit mount 34 adjacent the fiber mount 32 to allow the optical signal from the one or more collection optical fibers to pass through the opening 38. The optical slit 40 is preferably disposed in a disk 42 which is sized to fit within the slit mount 34.

Directly affixing the slit at the end of the optical fibers provides some important advantages. In particular, at least one lens, and often two lenses, can be eliminated from the spectrograph. Because there are signal losses associated with each optical component and optical interface in a spectrograph, eliminating lenses and optical interfaces improves the performance of the spectrograph. In addition, eliminating large components, such as lenses, from the spectrograph renders the device more compact and robust because there are fewer components which can fall out of alignment.

Figure 4:
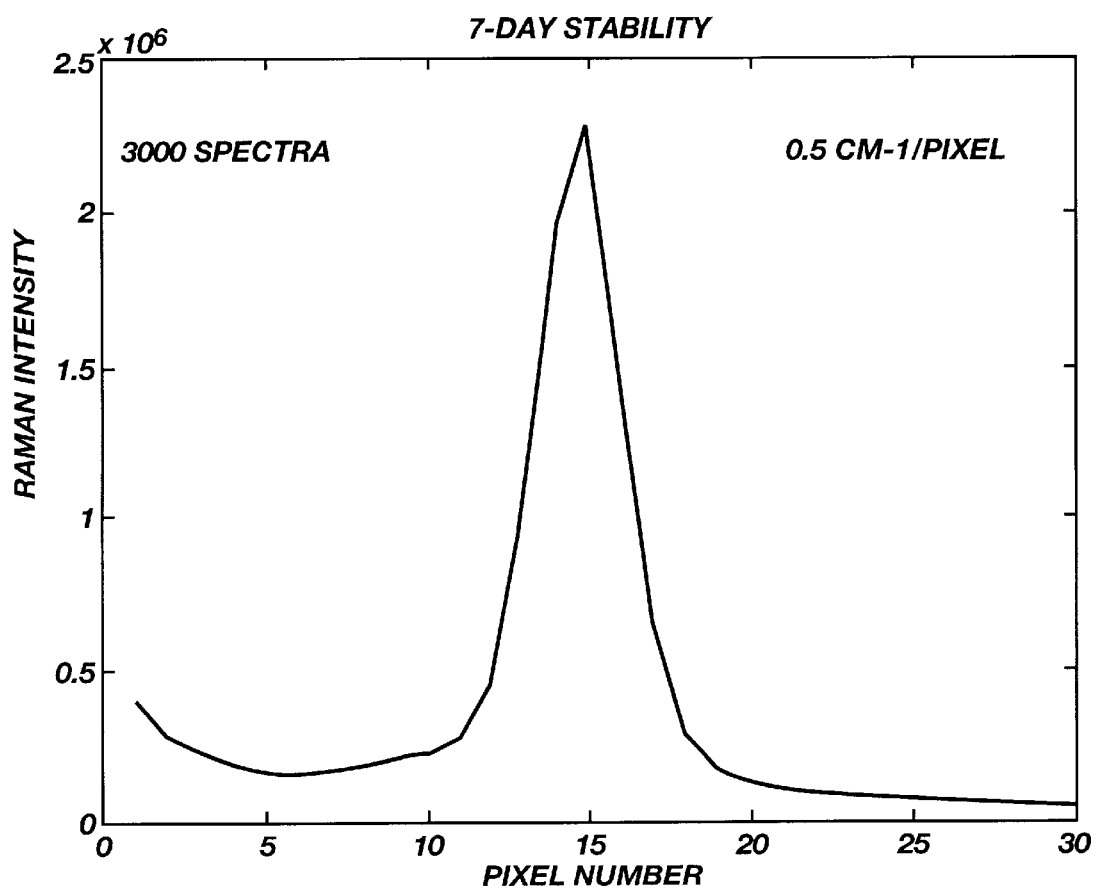
FIG. 4 is a graph illustrating the frequency stability of the primary Raman peak for 3000 Raman spectra recorded over a seven-day period.

The spectrograph apparatus 10 has been found to be very stable in its operation. FIG. 4 is a graph illustrating the frequency stability of the primary Raman peak for 3000 Raman spectra recorded over a seven-day period. Very little frequency drift was observed over the seven days and 3000 spectra.

Figure 5:
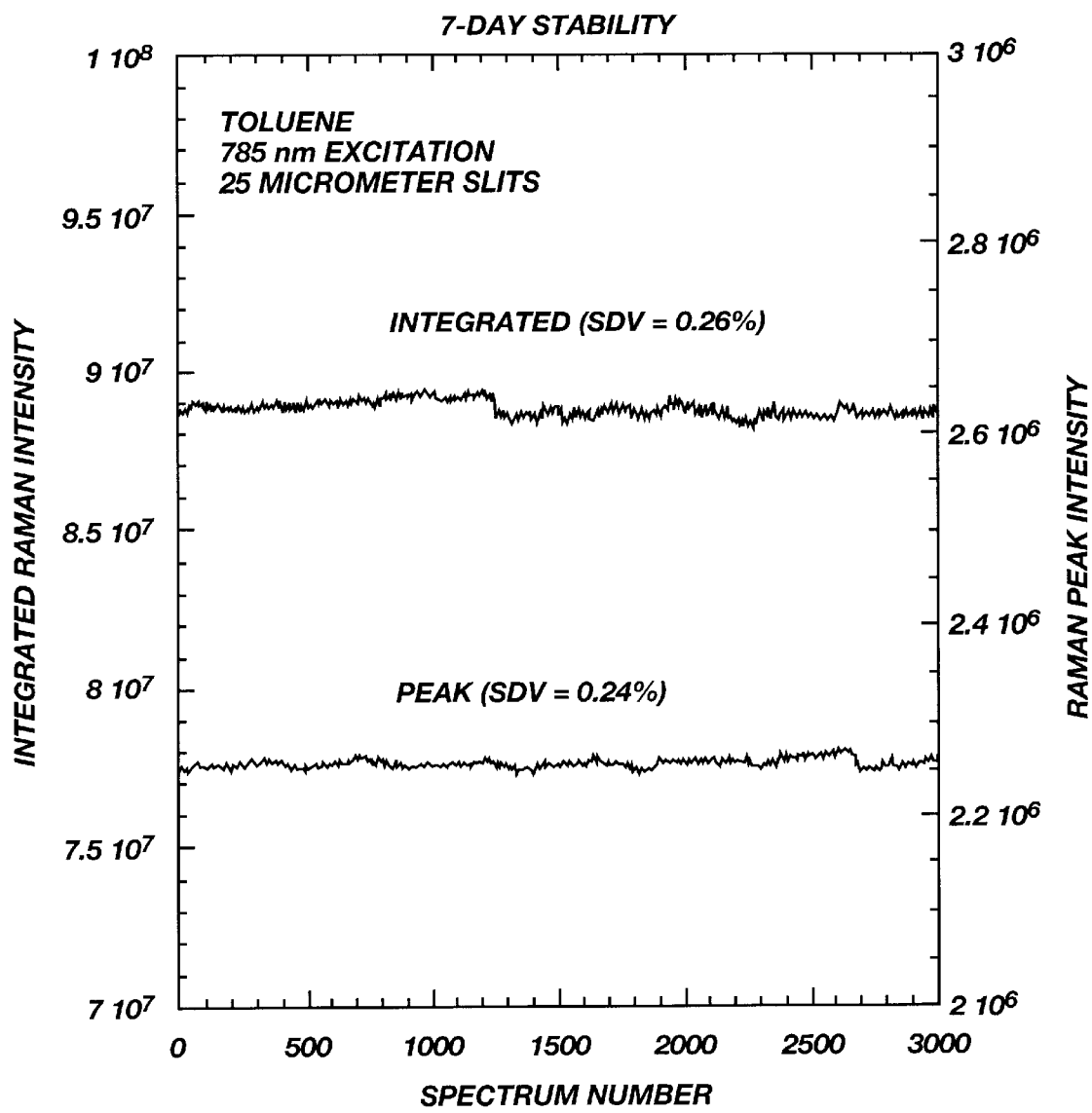
FIG. 5 is a graph illustrating the amplitude stability of primary Raman peak amplitude and the integrated Raman spectrum for 3000 Raman spectra recorded over a seven-day period.

FIG. 5 is a graph illustrating the amplitude stability of primary Raman peak amplitude and the integrated Raman spectrum for 3000 Raman spectra recorded over a seven-day period. The standard deviation of the peak and integrated signals were 0.24% and 0.26%, respectively. These results suggest that the small, compact spectrograph provides good, stable operation over an extended time period.

It should be appreciated that the spectrograph apparatus for analyzing the composition of a sample according to the present invention is capable of being incorporated in the form of a variety of embodiments, only a few of which have been illustrated and described above. The invention may be embodied in other forms without departing from its essential characteristics. The described embodiments are to be considered in all respects only as illustrative and not restrictive.

What is claimed is:

1. A spectrograph apparatus for analyzing a sample within a sample cell, wherein the sample cell is illuminated with light having an excitation wavelength, said spectrograph comprising:

one or more collection optical fibers configured to be optically connected to the sample cell for receiving scattered light from the sample cell as an optical signal;

an optical slit affixed at one end of the optical fibers;

a collimating lens configured to receive the optical signal that passes through the slit, wherein the slit is disposed between the collection optical fibers and the collimating lens;

a reflective diffraction grating configured to receive the optical signal from the collimating lens and to disperse and reflect the signal;

a focusing lens configured to receive and focus the optical signal from the reflective diffraction grating; and a light sensor configured to receive and convert the optical signal into a corresponding electronic signal.

2. An apparatus as defined in claim 1, further comprising a computer for converting the electronic signal into a representation of the analysis of the sample.

3. An apparatus as defined in claim 1, further comprising a notch or high-pass filter which does not transmit the excitation wavelength.

4. An apparatus as defined in claim 1, further comprising an absorption filter which absorbs light having the excitation wavelength.

5. An apparatus as defined in claim 1, wherein the excitation wavelength is in the range from 400 nm to 870 nm.

6. An apparatus as defined in claim 1, wherein the excitation wavelength has a bandwidth less than 30 GHz.

7. An apparatus as defined in claim 1, wherein the slit has a width in the range from 20 to 150 μm.

8. An apparatus as defined in claim 1, wherein the reflective diffraction grating has between 600 and 1800 grooves/mm.

9. An apparatus as defined in claim 1, wherein the reflective diffraction grating has a diffraction efficiency greater than 70%.

10. An apparatus as defined in claim 1, wherein the collimating lens has an f-number in the range from f/1 to f/2.

11. An apparatus as defined in claim 1, wherein the collimating lens has a focal length in the range from 25 mm to 75 mm.

12. An apparatus as defined in claim 1, wherein the focusing lens has an f-number in the range from f/1 to f/2.

13. An apparatus as defined in claim 1, wherein the focusing lens has a focal length in the range from 25 mm to 75 mm.

14. An apparatus as defined in claim 1, wherein the sample cell comprises an absorption filter which absorbs light having the excitation wavelength.

15. An apparatus as defined in claim 14, wherein the absorption filter is oriented at an angle to minimize reflection of the light directed into the sample cell back to the one or more collection optical fibers.

16. An apparatus as defined in claim 1, wherein the sample cell comprises a sample stream inlet and a sample stream outlet for continuous sample flow through the sample cell.

17. An apparatus as defined in claim 1, wherein the collimating lens consists of multiple spherical elements.

18. An apparatus as defined in claim 1, wherein the focusing lens consists of multiple spherical elements.

19. An apparatus as defined in claim 1, further comprising means for controlling the temperature within the apparatus.

20. An apparatus for analyzing a sample using Raman spectroscopy comprising:

a Raman sample cell;

a laser source for producing light having an excitation wavelength in the range from 400 nm to 870 nm and a bandwidth less than 30 GHz, wherein said laser source is coupled to the Raman sample cell to direct light into the Raman sample cell;

an optical connector for connecting one or more collection optical fibers to the sample cell for receiving scattered light from the sample cell as an optical signal;

a Raman spectrograph comprising:
one or more collection optical fibers, having an optical slit affixed at an end thereof, wherein the slit has a width in the range from 20 to 150 μm;
a collimating lens configured to receive the optical signal that passes through the slit, wherein the slit is disposed between the collection optical fibers and the collimating lens, wherein the collimating lens has an f-number in the range from f/1 to f/2 and a focal length in the range from 25 mm to 75 mm, wherein the collimating lens consists of multiple spherical elements;
a reflective diffraction grating configured to receive the optical signal from the collimating lens and to disperse and reflect the signal to a focusing lens, wherein the reflective diffraction grating has between 600 and 1800 grooves/mm and a diffraction efficiency greater than 70%;
said focusing lens configured to receive and focus the optical signal from the reflective diffraction grating, wherein the focusing lens has an f-number in the range from f/1 to f/2 and a focal length in the range from 25 mm to 75 mm, wherein the focusing lens consists of multiple spherical elements; and
a light sensor for converting the optical signal into a corresponding electronic signal; and
a computer for converting the electronic signal into a representation of the analysis of the sample.

21. An apparatus as defined in claim 20, wherein the Raman spectrograph further comprises an absorption filter which absorbs light having the excitation wavelength.

22. An apparatus as defined in claim 20, wherein the Raman sample cell further comprises an absorption filter which absorbs light having the excitation wavelength.

23. An apparatus as defined in claim 22, wherein the absorption filter is oriented at an angle to minimize reflection of the light directed into the Raman sample cell back to the one or more collection optical fibers.

24. An apparatus as defined in claim 20, wherein the Raman sample cell comprises a sample stream inlet and a sample stream outlet for continuous sample flow through the sample cell.

* * * * *